United States Patent
Wright, II et al.

(10) Patent No.: US 8,718,236 B1
(45) Date of Patent: May 6, 2014

(54) SYSTEMS AND METHODS FOR SECURE ON-LINE REPOSITORIES

(75) Inventors: William H. Wright, II, San Antonio, TX (US); Jon McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1628 days.

(21) Appl. No.: 11/450,670

(22) Filed: Jun. 9, 2006

(51) Int. Cl.
*H04M 1/64* (2006.01)
*H04B 7/14* (2006.01)

(52) U.S. Cl.
USPC .......................................... 379/67.1; 455/18

(58) Field of Classification Search
USPC ......... 379/9.04, 68, 71, 85, 266.1, 113, 67.01
See application file for complete search history.

(56) References Cited

U.S. PATENT DOCUMENTS

| | | | |
|---|---|---|---|
| 5,864,871 A | 1/1999 | Kitain et al. | |
| 6,122,625 A * | 9/2000 | Rosen | 705/65 |
| 6,192,472 B1 | 2/2001 | Garay et al. | |
| 6,411,943 B1 | 6/2002 | Crawford | |
| 7,062,535 B1 | 6/2006 | Stark et al. | |
| 7,117,171 B1 | 10/2006 | Pollin | |
| 2001/0047347 A1 | 11/2001 | Perell et al. | |
| 2001/0056387 A1 | 12/2001 | Magary et al. | |
| 2003/0012346 A1* | 1/2003 | Langhart et al. | 379/67.1 |
| 2004/0093493 A1 | 5/2004 | Bisbee et al. | |
| 2004/0111619 A1 | 6/2004 | Laurie et al. | |
| 2004/0193907 A1 | 9/2004 | Patanella | |
| 2004/0210534 A1* | 10/2004 | Jackson et al. | 705/52 |
| 2005/0203885 A1 | 9/2005 | Chenevich et al. | |
| 2006/0084414 A1* | 4/2006 | Alberth et al. | 455/414.1 |
| 2006/0271543 A1* | 11/2006 | Dodson et al. | 707/9 |
| 2007/0036302 A1* | 2/2007 | Cho | 379/88.23 |
| 2007/0214365 A1* | 9/2007 | Cornett et al. | 713/183 |
| 2007/0226199 A1* | 9/2007 | Moore et al. | 707/3 |
| 2007/0282615 A1* | 12/2007 | Hamilton et al. | 705/1 |
| 2008/0233928 A1* | 9/2008 | Han et al. | 455/414.1 |

OTHER PUBLICATIONS

If You Lose All Your Data Today . . . Will You Still Be in Business Tomorrow?, http://www.usdatatrust.com/landing/online-backup.asp, *U.S. Data Trust: Online Data Backup Services*, 2006.
eOriginal SmartSign® On Demand, http://www.eoriginal.com/products/ss_ondemand.html, *eOriginal Products: SmartSign*, 2006.
Information security for the extended enterprise, http://www.cyber-ark.com/datasecuritysoftware/index.asp?gclid=CMXUrsift4UCFTntJAodxCazzA, *Cyber-Ark*, 2006.

(Continued)

*Primary Examiner* — Fan Tsang
*Assistant Examiner* — Solomon Bezuayehu
(74) *Attorney, Agent, or Firm* — Brooks, Cameron & Huebsch, PLLC (57) ABSTRACT

A permanent, secure, on-line electronic repository (i.e., electronic safety deposit box or virtual safety deposit box) where a member/customer can store personal information (in electronic form) is provided within the confines and behind the security layers provided by a financial institution such as a bank. Features include catalog functionality for easy management and retrieval of data, access control facilities for the owner to designate other individuals authorized for access, event-driven access dedicated privacy with a subset space for shared elements with the bank (provider), and survivorship functionality with regard to disposition of contents, and intelligent retention rules.

15 Claims, 8 Drawing Sheets

(56) References Cited

OTHER PUBLICATIONS

Keeping your data safe . . . keeps you in business, http://www.centraldatavault.com/index.htm, *Central Data Vault, Online Backup Freed Trial, Computer Remote Backup*, 2006.

Electronic Safety Deposit Box, http://www.whynot.net/view_idea?id=1110, *Why N?t, Electronic Safety Deposit Box*, 2006.

VeriSign, "Security Solutions in Support Compliance with the Gramm-Leach-Bliley Act", 2003. 2 pgs.

Hasan, et al., "Toward a Threat Model for Storage Systems," StorageSS 2005, Nov. 11, 2005. 9 pgs.

* cited by examiner

SYSTEMS AND METHODS FOR SECURE ON-LINE REPOSITORIES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, USAA.

CROSS REFERENCE TO RELATED APPLICATIONS

This application is related to the following commonly-assigned patent applications, the entire contents of which are hereby incorporated in this present application by reference: U.S. patent application Ser. No. 11/450,008, filed Jun. 9, 2006, entitled "Systems and Methods for Secure On-line Repositories", U.S. patent application Ser. No. 11/450,669, filed Jun. 9, 2006, entitled "Systems and Methods for Secure On-line Repositories", U.S. patent application Ser. No. 11/450,014, filed Jun. 9, 2006, entitled "Systems and Methods for Secure On-line Repositories", U.S. patent application Ser. No. 11/450,673, filed Jun. 9, 2006, entitled "Systems and Methods for Multi-user Accessible Secure On-line Repositories", U.S. patent application Ser. No. 11/450,671, filed Jun. 9, 2006, entitled "Systems and Methods for Multi-user Accessible Secure On-line Repositories", U.S. patent application Ser. No. 11/450,675, filed Jun. 9, 2006, entitled "Systems and Methods for Electronic Delivery of Documents Using Secure On-line Repositories", U.S. patent application Ser. No. 11/450,691, filed Jun. 9, 2006, entitled "Systems and Methods for Electronic Delivery of Documents Using Secure On-line Repositories", U.S. patent application Ser. No. 11/450,674, filed Jun. 9, 2006, entitled "Systems and Methods for a Document Exchange Medium Using Secure On-line Repositories", and U.S. Patent application Ser. No. 11/450,428, filed Jun. 9, 2006, entitled "Systems and Methods for a Document Exchange Medium Using Secure On-line Repositories".

BACKGROUND

It is often difficult to keep track of critical, personal records whether they be in digital format or on paper. Safety deposit boxes, file cabinets, shoe boxes in the closet, and so forth have been used to meet this need in the past (albeit inadequately). Furthermore, messages (indirect communications) received through several different media (e.g., phone, fax, email, mail, etc.) are difficult to manage and are typically processed separately. There is a need for a centralized, personal, secure document storage facility, preferably electronic-based (not paper-based) that provides something more than simple share-drive space from a commercial service and can treats all indirect communications as a single category that can be processed in the facility.

Also, there is difficulty in recording and storing an on-phone conversation for purposes of creating a true "record" of that conversation for later use. This applies to both recording conversations between a customer and their financial services provider as well as between the customer and a third party. With regard to the former, a recording would empower the member with an ability to hold their financial services provider accountable for information they provide and services they render. With regard to the latter, a member might like their financial services provider (as an objective third party) to record a conversation with a third party that is of a confrontational nature.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for secure on-line repositories are provided. For several embodiments, a system for providing data storage to a customer comprises at least one subsystem that designates a portion of data storage space, remotely accessible by the customer over a computer network, as a repository for the customer to store personal data. At least one subsystem is included that controls network access to the repository such that that the customer may access the repository by going through an authentication process, along with at least one subsystem that provides network security and regulatory controls and physical security and regulatory controls to protect data stored within the repository at least as stringent as those that a financial services institution is required by law to have in place to protect its own data.

Other advantages and features of the invention are described below.

BRIEF DESCRIPTION OF THE DRAWINGS

Systems and methods for secure on-line repositories are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environments

Figure 1:
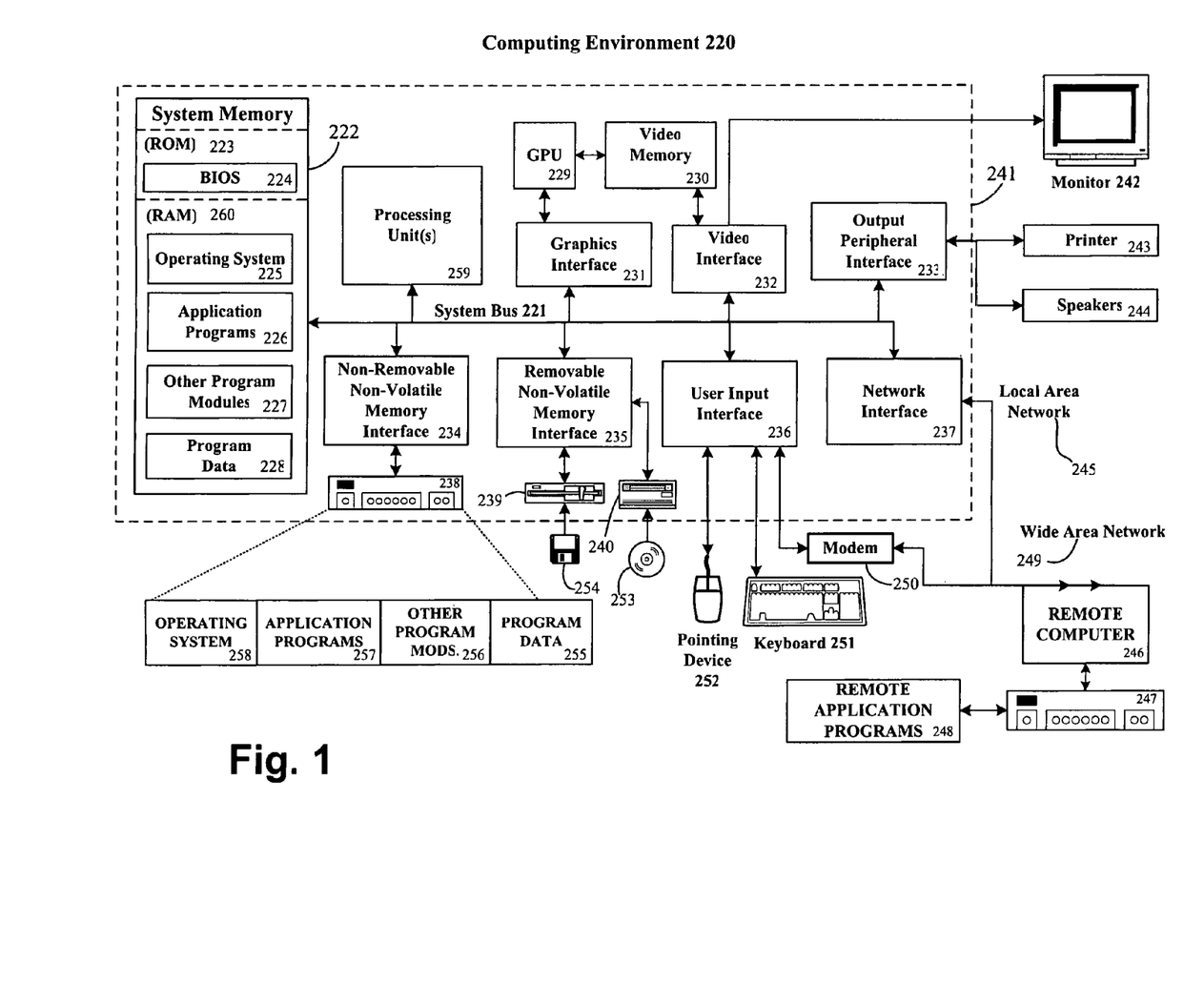
FIG. 1 is a block diagram representing an exemplary computing device suitable for use in conjunction with providing systems and methods for secure on-line repositories.

Referring to FIG. 1, shown is a block diagram representing an exemplary computing device suitable for use in conjunction with implementing the processes described above. For example, the computer executable instructions that carry out the processes and methods for providing secure on-line repositories may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
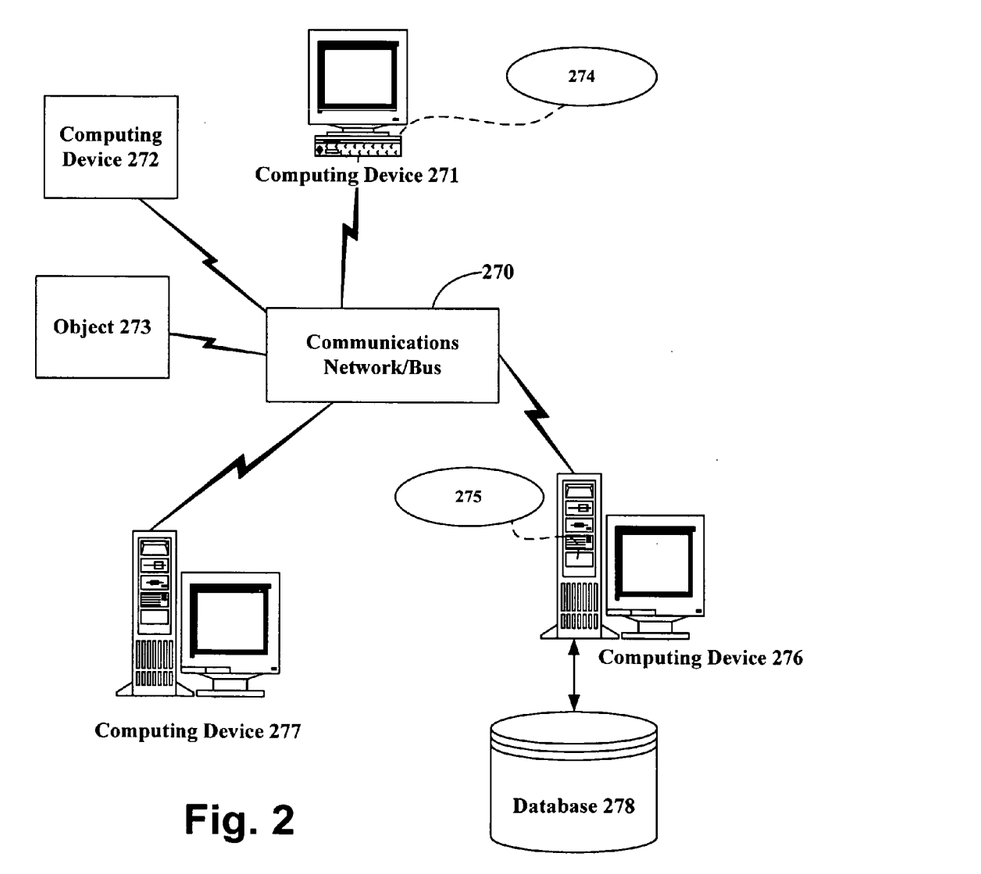
FIG. 2 illustrates an exemplary networked computing environment in which many computerized processes may be implemented to provide systems and methods for secure on-line repositories.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the processes for implementing secure on-line repositories. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Secure On-line Storage

A permanent, secure, on-line electronic repository provides a member/customer a place to store personal information such as birth certificates, wills, deeds, etc. in electronic form. Uniquely, this storage is provided by a bank or similar institution and thus akin to an electronic safety deposit box or "virtual" safety deposit box. Features include, for example, catalog functionality for easy management and retrieval, access control facilities for the "owner" to designate other individuals authorized for access, event-driven access (e.g., survivorship, etc.), dedicated privacy with a subset space for "shared" elements with the bank (provider), survivorship functionality with regard to disposition of contents, and intelligent retention rules.

Figure 3:
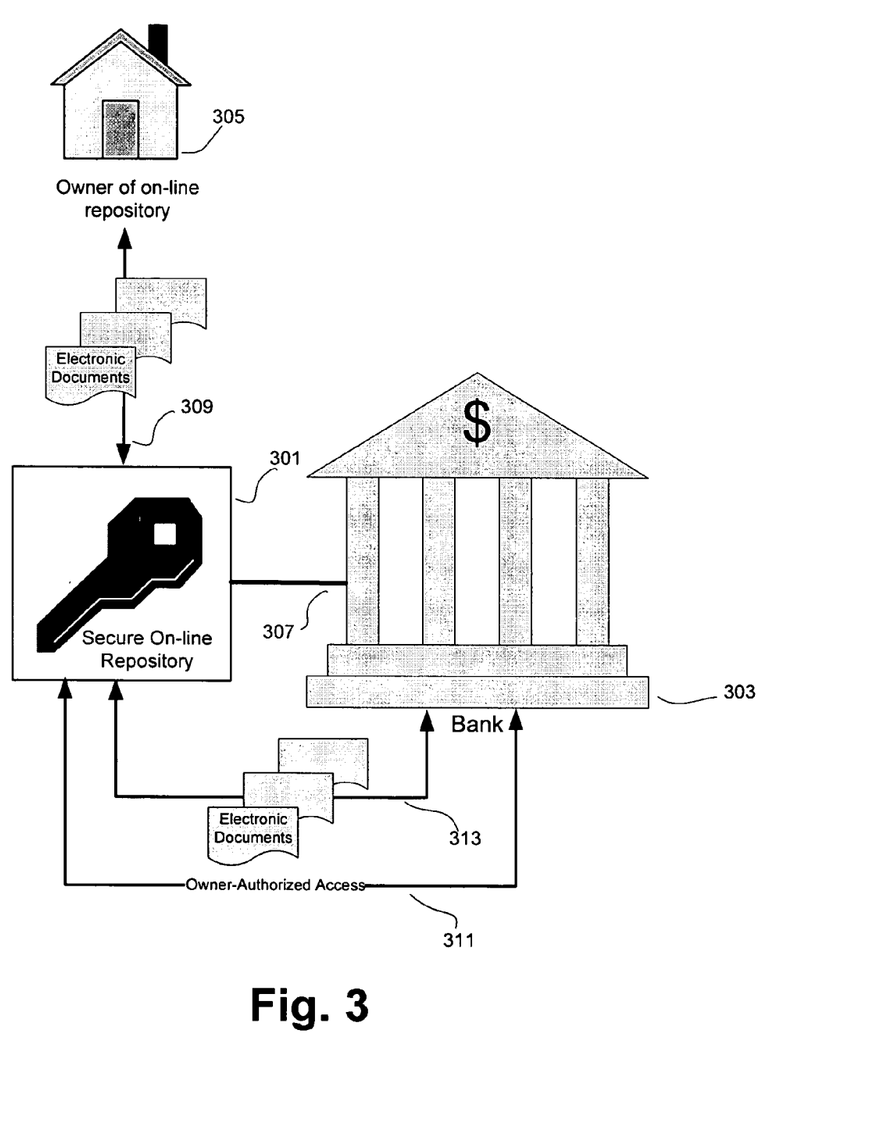
FIG. 3 is a diagram illustrating an example of a secure on-line repository system.

Referring to FIG. 3, shown is a diagram illustrating an example of a secure on-line repository system. Security and data protection for the on-line repository 301 is provided by an institution such as a bank 303 that has the technology in place to provide enhanced security, survivability, and compliance with the many regulatory controls associated with banks and other financial institutions. The bank 303 applies the same several layers of security that it employs over its own records to the owner's 305 on-line repository 301. The institution 303, however, need not be a bank, but is one that provides a similar level of security and reliability of a bank such as that described above. The bank 303 provides such security, for example, in part by having a level of physical access control as well as network access control 307 over the storage devices on which the repository 301 resides. Examples of storage devices include but are not limited to: computer hard drives, optical discs, solid state memory, removable media and others described above with respect to the example computer system of FIG. 1.

The bank 303 registers an owner 305 of the on-line repository 301 (perhaps for a fee or as a free service), and provides secure access 309 to the on-line repository for that owner 305. As a private on-line repository 301, only the registered owner would have access to the documents stored within the repository unless permission is given to other users of the system. Even the bank 303, would not have access to view, edit or delete, documents stored within the repository 309 absent permission from the owner or a legal mandate. Access is provided such that the owner 305 can perform a variety operations and tasks with respect to their on-line repository including, but not limited to: storing, sharing, copying and viewing electronic documents, defining and setting attributes, properties or permissions of stored electronic documents, editing and saving electronic documents, setting pre-defined rules for automatic actions to be taken on electronic documents, moving documents from one section of the repository to another, and deleting or destroying electronic documents stored within the repository 301. The owner may also authorize 311 the bank 303 to deliver bank documents 313 (e.g., bank statements) to the owner 305 via the on-line repository rather than emailing or mailing them, for example.

Centralized Delivery Point and Storage for Messages

Figure 4:
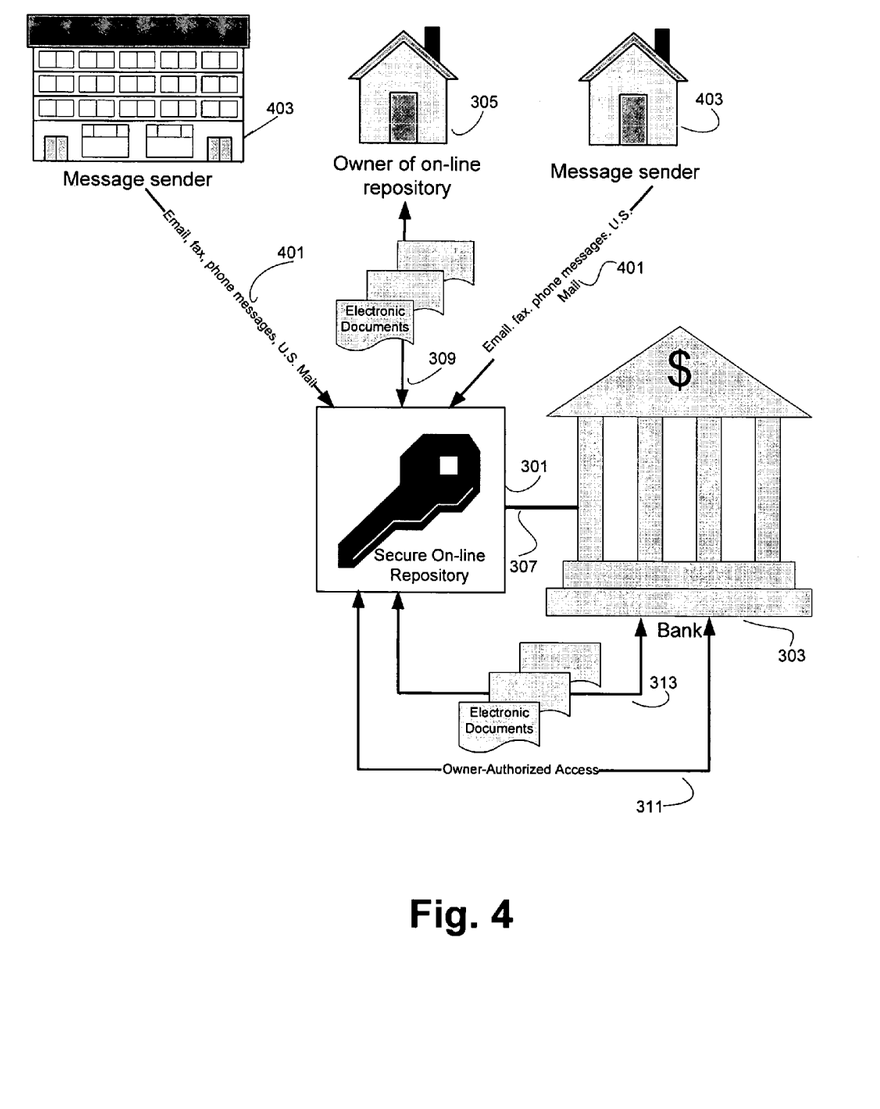
FIG. 4 is a diagram illustrating an example of a secure on-line repository system used as a centralized delivery point and store for messages from a variety of sources and mediums.

Referring next to FIG. 4, shown is a diagram illustrating an example of a secure on-line repository system used as a centralized delivery point and store for messages from a variety of sources and mediums. Shown is a centralized, secure electronic repository 301 system that is configured to receive communications 401 from more than one typical medium or source 403 and store those messages for access, processing, and long-term retention if desired in the secure on-line repository 301. For example, the messages 401 may include but are not limited to: email, faxes, phone or voicemail messages, paper mail, text messages, live interne chat messages, etc.

Figure 5:
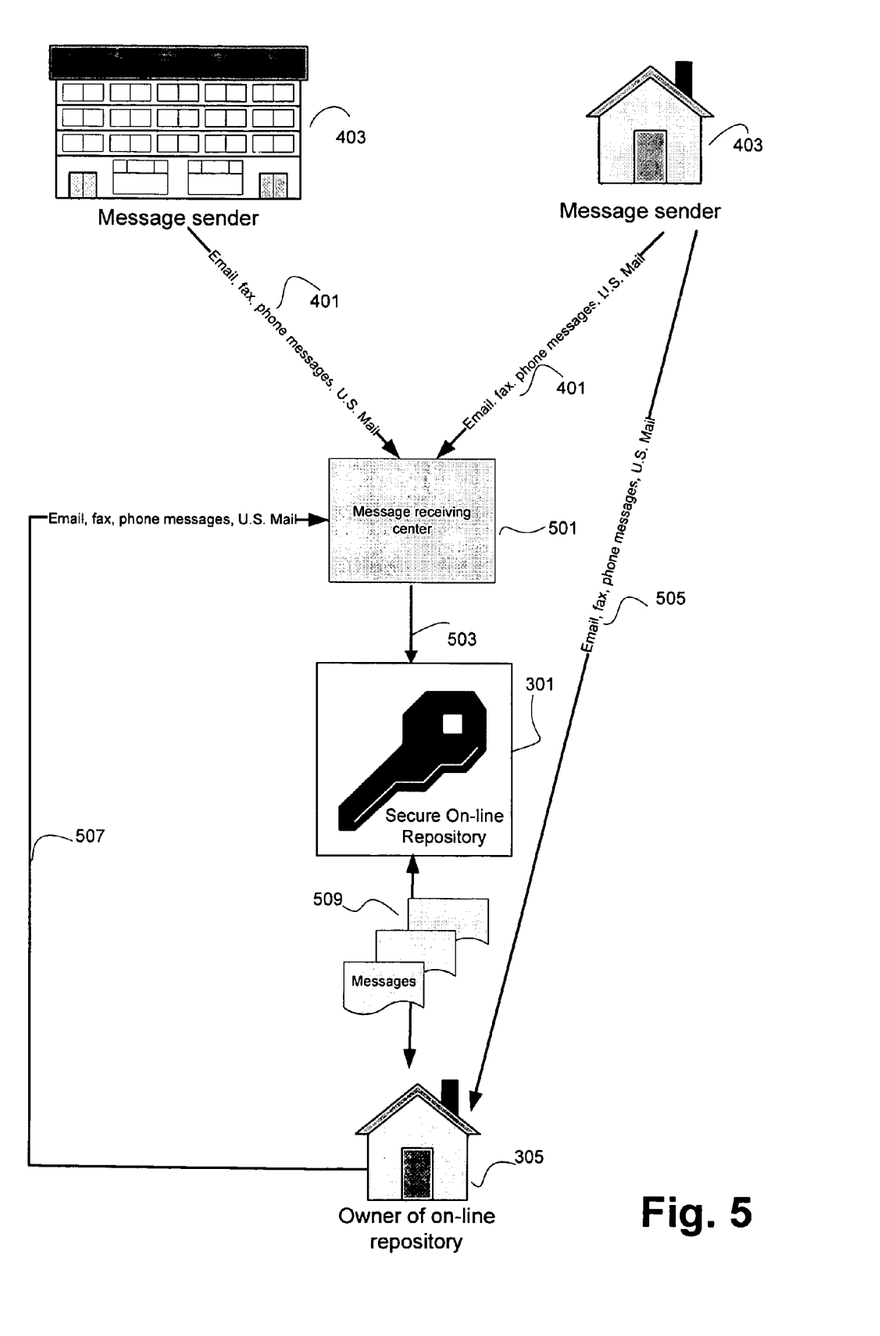
FIG. 5 is a diagram illustrating an example of a system for receiving and storing messages according to the repository system of FIG. 4.

Referring next to FIG. 5, shown is a diagram illustrating an example of a system for receiving and storing messages according to the repository system of FIG. 4. The message sender 403, sends the message 401 to a physical, email or network address, phone number or other destination identifier associated with the secure on-line repository of the person to whom the message is intended. A message receiving center 501 automatically identifies which secure repository the received message 401 is intended for and stores it 503 accordingly. In the case of paper messages, this includes scanning the paper pieces and collection of physical items for periodic collective delivery, for example. The message receiving center may be located within the bank 303 and could have a filtering mechanism for unwanted messages and add an additional level of security to protect against viruses, etc. Optionally, the message sender 403 could send 505 the messages directly to the owner 305 of the secure on-line repository 301, who would then bounce the received messages 507 (automatically or otherwise) to the message receiving center 501. The owner 305 of the secure on-line repository 301, would then have a secure and centralized storage facility as described above for retaining and processing all types messages from a variety of sources 403. The owner 305 accesses the secure repository as they normally would and is able to download, forward and otherwise manage the messages within the repository 301 which may be equipped with email, fax and/or other messaging software.

Recording and Storage of Third Party Phone Conversations

Figure 6:
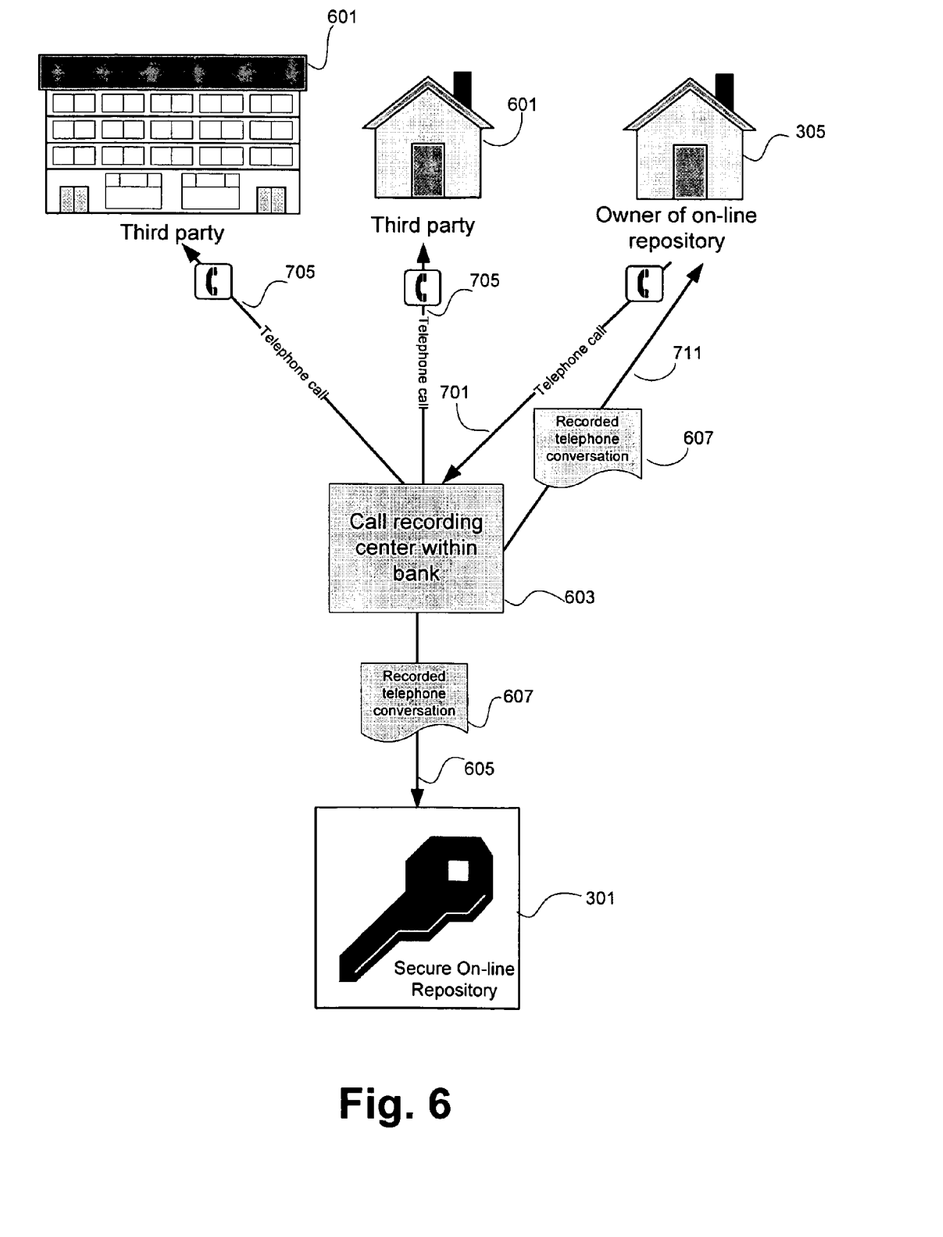
FIG. 6 is a diagram illustrating an example of a system of a system for providing secure recording and storage of third party phone conversations.

Referring next to FIG. 6, shown is a diagram illustrating an example of system for providing secure recording and storage of third party phone conversations. Shown is an owner 305 of the secure on-line repository 301 in communication with one or more third parties 601 through a call recording center 603 within, or controlled by, the same bank or financial institution 303 as that which controls access to the secure on-line repository 301. This provides both accountability and an objective source of recording of the third party conversation for the customer/owner 305. Also, the conversation recorded could be one that is only between the bank and the customer/owner 305 if it involves business only between the bank and customer/owner, for example. The recorded conversation 607 is stored 605 directly in the owner's 305 secure on-line repository 301 as it is being recorded or directly afterward. Also, the recorded telephone conversation may be delivered automatically from the call recording center 603 or from the secure on-line repository 301 to the owner 305 of the secure on-line repository 301 via electronic means such as email or otherwise. In this case, if delivered automatically from the call recording center 603, an individually owned secure on-line repository 301 would not be required.

Figure 7:
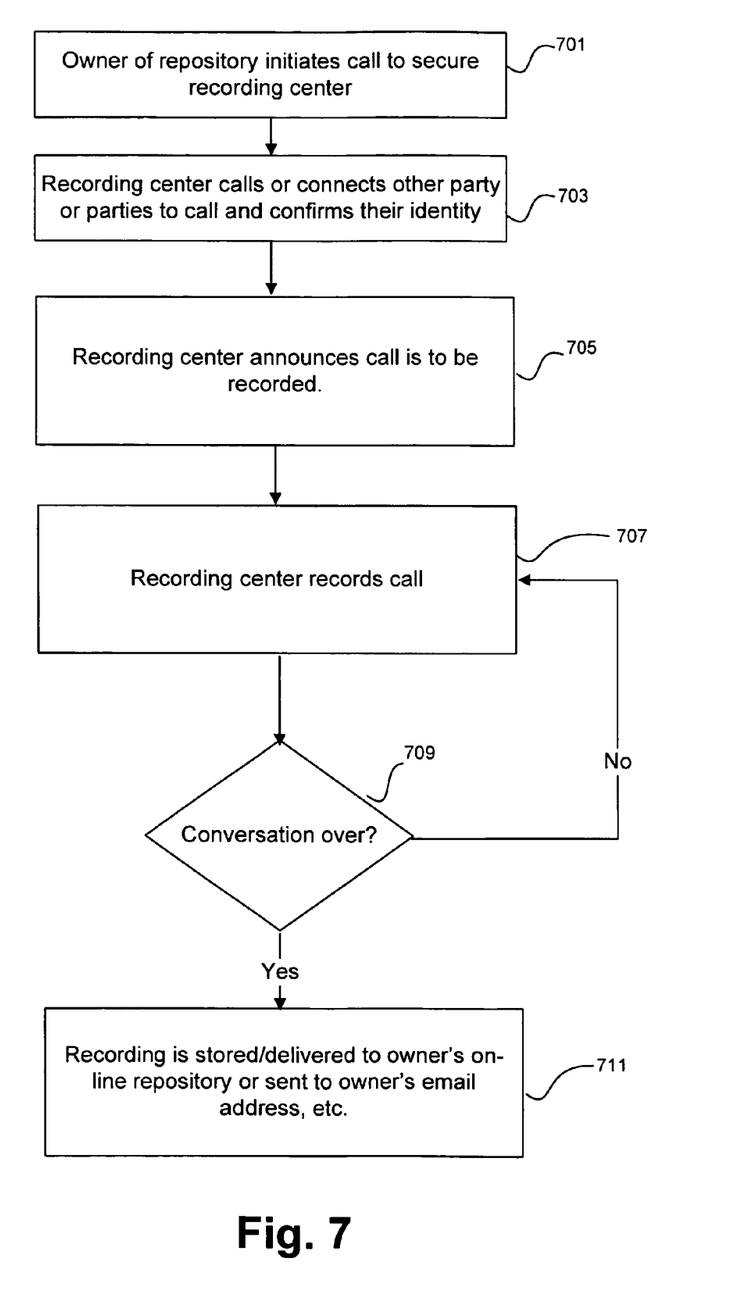
FIG. 7 is a flow chart diagram illustrating an example process for providing secure recording and storage of third party phone conversations according to the system of FIG. 6.

Referring next to FIGS. 6 and 7, shown in FIG. 7 is a flow chart diagram illustrating an example process for providing secure recording and storage of third party phone conversations according to the system of FIG. 6. The owner 305 of the secure repository 301 initiates a call 701 to the call recording center 603. This call 701 alerts the call recording center that the owner 305 is requesting that a call to a third party 601 be recorded and as well as the telephone number(s) of the one or more third parties 601 to call. The call recording center 603 then places call(s) 705 to the one or more third parties 601 with the owner 305 on the line. The recording center 603 announces 705 that the call 705 is to be recorded and then initiates recording 707. This may be done with a live operator within the call recording center 603, or automated telephone system. Also, the operator or automated system may request permission that the call be recorded and record the response. As mentioned above, at this time, the recorded conversation 607 is stored 605 directly in the owner's 305 secure on-line repository 301 as it is being recorded or directly afterward. The system determines when the conversation is over 709 (e.g., the parties 601 305 hang up or the owner 305 indicates orally the recorded part of the conversation is to end). If the conversation is over, recording stops and the recorded conversation is stored directly in the owner's 305 secure on-line repository 301 (if not already) and/or delivered 711 to the owner 305 via other electronic means such as email, for example, or saved on removable media and shipped to the owner 305.

Example Underlying Architecture

Figure 8:
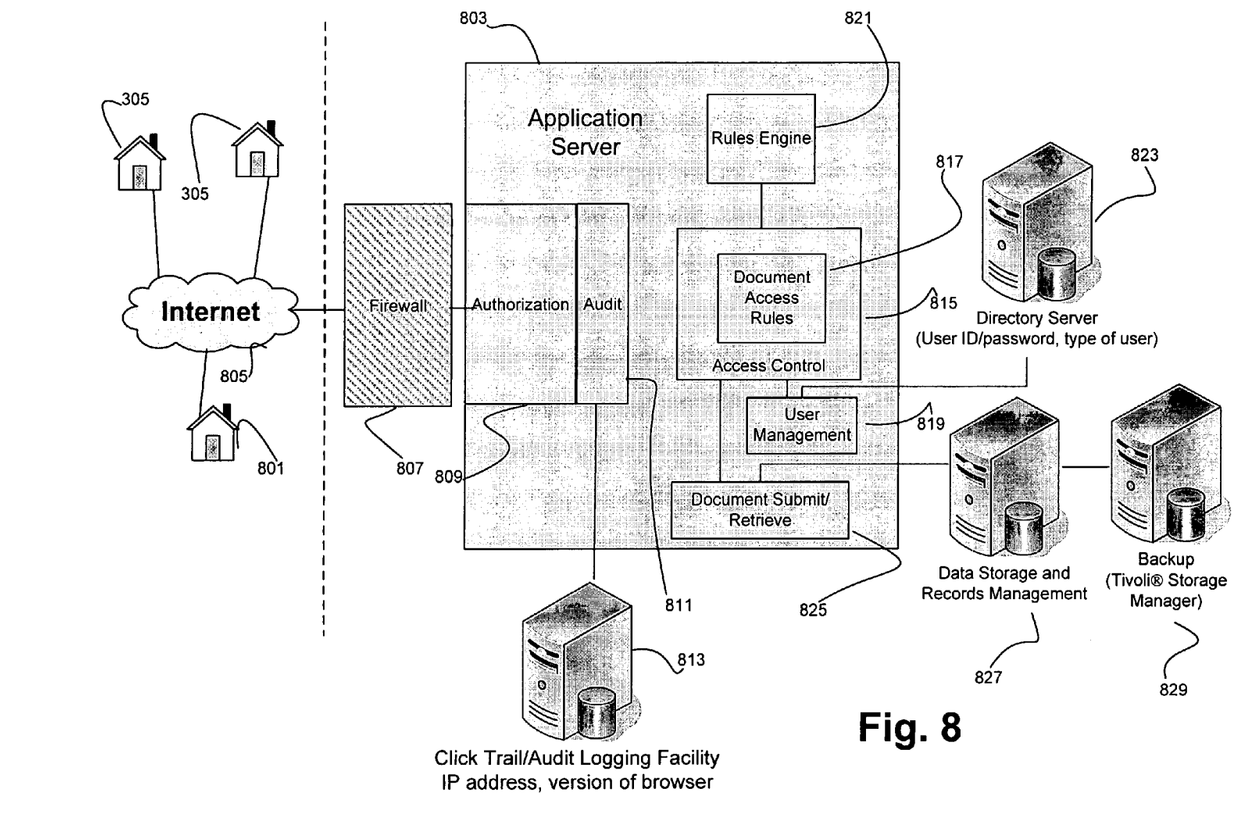
FIG. 8 is a diagram illustrating an example architecture for a system suitable for implementing a secure online repositories according to FIGS. 3 through 7.

Referring next to FIG. 8, shown is a diagram illustrating an example architecture for a system suitable for implementing secure online repositories according to FIGS. 3 through 7. Secure on-line repository owners 305 and authorized users 801 access an application server over a computer network such as the interne, for example, through a firewall 807. The firewall 807 is a set of related programs, located at a network gateway server, that protects the resources of the private network on which the secure repositories reside by enforcing security policies For example, the firewall 807 may verify the owners 305 and authorized users 801 before they enter the network by way of a user ID, Password or IP address.

Once the firewall 807 is passed and user authentication 809 is complete, the auditing component 811 starts storing audit information such as the web pages the repository owner 305 or authorized user 801 has visited (click trail), IP address, version of user's browser, etc., in the click trail logging facility 813. The access control component 815, in communication with the authentication component 809 and user management component 819, provides authentication information such as user ID, password from the directory server 823 for authentication purposes. The access control component 815 also controls what type of access and to what resources and repositories the repository owner 305 or authorized user 801 is allowed access. This is based on the document access rules 817 consumed by and being executed on the rules engine component 821 in communication with the access control component 815. If the repository owner 305 or authorized user 801 is allowed such access requested, then the data is provided through the document submit/retrieve component 825. The document submit/retrieve component 825 is in communication with the actual physical storage facilities 827 829 on which the secure on-line repositories reside, an manages the transfer of the data between the storage facilities 827 829 and the application server 803. The data residing on the data storage and records management facility 827 is backed up according to the records management policies and regulations associated with financial and other highly regulated institutions. One example of a backup system with capabilities suitable for implementing such data storage standards is Tivoli® Storage Manager 829, but other suitable backup systems may be used as well.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed is:

1. A system for initiating and recording a telephone conversation for a customer comprising:
   at least one subsystem that receives a phone call from the customer requesting to record a phone conversation;
   at least one subsystem that, while the customer is still on the phone call and if the customer wishes to record a telephone conversation with a third party, places a phone call to the third party with whom the customer wishes to record the telephone conversation;
   at least one subsystem that request permission from the third party to record the telephone conversation and record the third party's response to the request;
   at least one subsystem that starts recording the telephone conversation, and if the conversation is with a third party said recording starting at some point after the third party answers;
   at least one subsystem that stops recording once the conversation is completed;
   at least one subsystem that provides network security and regulatory controls and physical security and regulatory controls to protect the data of the recorded phone conversation as it is being recorded;
   at least one subsystem that automatically delivers the recorded phone conversation to the customer once the conversation is completed;
   at least one subsystem that designates a portion of data storage space, remotely accessible by the customer over a computer network, as an online repository for the customer to store personal data, wherein the personal data includes personal documents of the customer in electronic form, wherein the personal documents of the customer include at least one of:
   a birth certification of the customer
   a will of the customer; and
   a deed of the customer;
   at least one subsystem that stores the recorded phone conversation in the repository;
   at least one subsystem that provides the customer the ability to designate a particular access to the repository to occur when a particular event occurs, wherein:
     the particular access to the repository is access to the repository by another individual; and
     the particular event is a death of the customer; and
   at least one subsystem that:
     receives a notification that the death of the customer has occurred; and
     automatically transfers ownership of the repository and data stored within the repository upon receipt of the notification that the death of the customer has occurred and according to survivorship policies set by the customer designating an individual to receive ownership of the repository and data stored within the repository upon the death of the customer.

2. The system of claim 1 further comprising:
   at least one subsystem that controls network access to the repository such that that the customer may access the repository by going through an authentication process.

3. The system of claim 1 wherein the conversation recorded is between the customer and an entity performing the recording.

4. The system of claim 1 wherein the computer network is the internet.

5. The system of claim 1 wherein the financial services institution is a bank.

6. A method of initiating and recording a telephone conversation for a customer comprising:
   receiving a phone call from the customer requesting to record a phone conversation;
   while the customer is still on the phone call and if the customer wishes to record a telephone conversation with a third party, placing a phone call to the third party with whom the customer wishes to record the telephone conversation;
   requesting permission from the third party to record the telephone conversation and recording the third party's response to the request;
   starting recording of the telephone conversation, and if the conversation is with a third party said recording starting at some point after the third party answers;
   stopping recording once the conversation is completed;
   providing network security and regulatory controls and physical security and regulatory controls to protect the data of the recorded phone conversation as it is being recorded;
   automatically delivering the recorded phone conversation to the customer once the conversation is completed;
   designating a portion of data storage space, remotely accessible by the customer over a computer network, as an online repository for the customer to store personal data, wherein the personal data includes personal documents of the customer in electronic form, wherein the personal documents of the customer include at least one of:
   a birth certificate of the customer;
   a will of the customer; and
   a deed of the customer;
   storing the recorded phone conversation in the repository;

providing the customer the ability to designate a particular access to the repository to occur when a particular event occurs, wherein:
- the particular access to the repository is access to the repository by another individual; and
- the particular event is a death of the customer;

receiving a notification that the death of the customer has occurred; and automatically transferring ownership of the repository and data stored within the repository upon receipt of the notification that the death of the customer has occurred and according to survivorship policies set by the customer designating an individual to receive ownership of the repository and data stored within the repository upon the death of the customer.

7. The method of claim 6 further comprising:
controlling network access to the repository such that that the customer may access the repository by going through an authentication process.

8. The method of claim 6 wherein the conversation recorded is between the customer and an entity performing the recording.

9. The method of claim 6 wherein the computer network is the internet.

10. The method of claim 6 wherein the financial services institution is a bank.

11. A non-transitory computer readable medium comprising computer-readable instructions for initiating and recording a telephone conversation for a customer, said computer readable instructions comprising instructions for:

receiving a phone call from the customer requesting to record a phone conversation;

while the customer is still on the phone call and if the customer wishes to record a telephone conversation with a third party, placing a phone call to the third party with whom the customer wishes to record the telephone conversation;

requesting permission from the third party to record the telephone conversation and recording the third party's response to the request;

starting recording of the telephone conversation, and if the conversation is with a third party said recording starting at some point after the third party answers;

stopping recording once the conversation is completed;

providing network security and regulatory controls and physical security and regulatory controls to protect the data of the recorded phone conversation as it is being recorded;

automatically delivering the recorded phone conversation to the customer once the conversation is completed;

designating a portion of data storage space, remotely accessible by the customer over a computer network, as an online repository for the customer to store personal data, wherein the personal data includes personal documents of the customer in electronic form, wherein the personal documents of the customer include at least one of:
- a birth certificate of the customer;
- a will of the customer; and
- a deed of the customer;

storing the recorded phone conversation in the repository;

providing the customer the ability to designate a particular access to the repository to occur when a particular event occurs, wherein:
- the particular access to the repository is access to the repository by another individual; and
- the particular event is a death of the customer;

receiving a notification that the death of the customer has occurred; and automatically transferring ownership of the repository and data stored within the repository upon receipt of the notification that the death of the customer has occurred and according to survivorship policies set by the customer designating an individual to receive ownership of the repository and data stored within the repository upon the death of the customer.

12. The non-transitory computer-readable medium of claim 11 further comprising instructions for:
controlling network access to the repository such that that the customer may access the repository by going through an authentication process.

13. The non-transitory computer-readable medium of claim 11 wherein the conversation recorded is between the customer and an entity performing the recording.

14. The non-transitory computer-readable medium of claim 11 wherein the computer network is the interne.

15. The non-transitory computer-readable medium of claim 11 wherein the financial services institution is a bank.

* * * * *

UNITED STATES PATENT AND TRADEMARK OFFICE
CERTIFICATE OF CORRECTION

PATENT NO.        : 8,718,236 B1
APPLICATION NO.   : 11/450670
DATED             : May 6, 2014
INVENTOR(S)       : William H. Wright, II and Jon D. McEachron It is certified that error appears in the above-identified patent and that said Letters Patent is hereby corrected as shown below:

In the Claims:

Column 14, Line 41, In Claim 14, delete "interne." and insert -- internet --

Signed and Sealed this
Fifth Day of August, 2014

Michelle K. Lee
*Deputy Director of the United States Patent and Trademark Office*